US012308043B2

(12) United States Patent
Gaalaas

(10) Patent No.: US 12,308,043 B2
(45) Date of Patent: May 20, 2025

(54) PLAYBACK ENHANCEMENT IN AUDIO SYSTEMS

(71) Applicant: Bose Corporation, Framingham, MA (US)

(72) Inventor: Joseph Gaalaas, Woodbury, MN (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 17/745,748

(22) Filed: May 16, 2022

(65) Prior Publication Data

US 2022/0277759 A1 Sep. 1, 2022

Related U.S. Application Data

(63) Continuation of application No. 16/103,039, filed on Aug. 14, 2018, now Pat. No. 11,335,357.

(51) Int. Cl.

| | |
|---|---|
| ***G06F 17/00*** | (2019.01) |
| ***G10L 21/0216*** | (2013.01) |
| ***G10L 21/0364*** | (2013.01) |
| ***H04R 5/04*** | (2006.01) |
| *G10L 21/0208* | (2013.01) |

(52) U.S. Cl.

CPC ...... *G10L 21/0364* (2013.01); *G10L 21/0216* (2013.01); *H04R 5/04* (2013.01); *G10L 2021/02082* (2013.01)

(58) Field of Classification Search

CPC ... G06L 21/0364; G06L 21/0216; H04R 5/04; G10L 2021/02082

USPC ........................................... 704/226; 700/94

See application file for complete search history.

(56) References Cited

U.S. PATENT DOCUMENTS

2007/0237271 A1* 10/2007 Pessoa ................ G10L 21/0208 375/346
2011/0224976 A1* 9/2011 Taal ........................ G10L 25/69 704/E21.002
2015/0188653 A1* 7/2015 Hanks .................. H04L 5/0037 370/203
2015/0286459 A1* 10/2015 Habets ...................... G06F 3/16 700/94
2016/0014534 A1* 1/2016 Sheen .................. H04R 29/007 381/59
2017/0034640 A1* 2/2017 Kirsch ..................... H04R 5/04
2017/0098456 A1* 4/2017 Ma ...................... G10L 21/0388
2017/0162213 A1* 6/2017 Anushiravani ......... G10L 25/48
2017/0358313 A1* 12/2017 Shih ................... G10L 21/0208
2018/0176869 A1* 6/2018 Aryafar ................ H04B 7/0695
2019/0110135 A1* 4/2019 Jensen ................ H04R 25/505

* cited by examiner

*Primary Examiner* — Paul C McCord
(74) *Attorney, Agent, or Firm* — Hoffman Warnick LLC

(57) ABSTRACT

Audio systems and methods are provided that enhance a portion of audio content relative to other portions of the audio content. The systems and methods select the portion to be enhanced and calculate an intelligibility metric of the selected portion, such as a dialogue portion. The systems and methods determine a gain based at least in part upon the intelligibility metric and apply the gain to the selected portion to provide an enhanced portion. The systems and methods provide an audio signal, based at least in part upon the enhanced portion, to an output for conversion to an acoustic signal, such as by an acoustic transducer.

20 Claims, 4 Drawing Sheets

PLAYBACK ENHANCEMENT IN AUDIO SYSTEMS

RELATED APPLICATIONS

This application is a continuation of U.S. patent application Ser. No. 16/103,039, filed Aug. 14, 2018, where the entire contents of the application are hereby incorporated by reference.

BACKGROUND

Audio systems sometimes include one or more acoustic transducers (e.g., drivers, loudspeakers) to reproduce acoustic audio content from an audio signal. Audio content may be intended to provide a particular acoustic experience for a consumer, such as audio for a movie, television, or gaming soundtrack that may include dialogue, music, sound effects, etc., and may be intended to be experienced in a controlled acoustic environment, such as a movie theatre, e.g., having high powered surround sound systems with high dynamic range and limited external noise sources. When the same audio content is reproduced in a different environment, such as a home, classroom, gymnasium, auditorium, etc., the acoustic experience may be significantly degraded. In various environments, detailed sounds or voices may be lost, hard to hear, or difficult to understand, due to extraneous noise in the environment, lower dynamic range of the sound system, lower listening volumes, mixing of audio content to accommodate fewer audio channels, and other factors.

SUMMARY

Aspects and examples are directed to systems and methods that adjust or modify a selected portion of audio content to enhance the user experience of the selected portion with respect to other portions of the audio content, and optionally with respect to further acoustic signals, such as noise or reverberation, associated with the environment in which the user consumes the audio content.

According to one aspect, an audio system is provided that includes an input to receive audio content, an output configured to be coupled to an acoustic driver through which to provide an audio signal to the acoustic driver, the acoustic driver configured to provide program acoustic signals to a listening environment, and a processor coupled to the input and to the output and configured to select a portion of the audio content to be enhanced relative to other portions of the audio content, to calculate an intelligibility metric of the selected portion, to determine a gain based at least in part upon the intelligibility metric, to apply the gain to the selected portion to provide an enhanced portion, and to provide the audio signal to the output based at least in part upon the enhanced portion.

In some examples, the processor is further configured to select the portion of the audio content as a dialogue portion and to calculate the intelligibility metric as a speech intelligibility metric of the selected dialogue portion relative to the other portions of the audio content. In certain examples, the processor may be further configured to select the portion of the audio content as a dialogue portion based upon at least one of a center channel of the audio content and a correlated portion of a left and right channel of the audio content.

In various examples, the processor is further configured to calculate a reference intelligibility metric based at least in part upon the audio content and a reference environment, and to determine the gain based at least in part upon a comparison of the intelligibility metric to the reference intelligibility metric.

Certain examples include one or more microphones to detect environmental acoustic signals in the listening environment and to provide an environmental noise signal, the processor being further configured to calculate the intelligibility metric of the selected portion relative to a combination of the other portions and the environmental noise signal. Some examples may also include an echo canceller coupled to the one or more microphones to reduce the program acoustic signals from the one or more microphones to provide the environmental noise signal.

According to some examples, the processor is further configured to calculate an enhanced intelligibility metric of the enhanced portion relative to the other portions of the audio content and to determine the gain based at least in part upon the intelligibility metric and the enhanced intelligibility metric.

According to another aspect, a method is provided for enhancing audio content in an audio sound system having an input to receive audio content and an output to provide an audio signal to an acoustic transducer. The method includes selecting a portion of the audio content to be enhanced, calculating an intelligibility metric of the selected portion relative to other portions of the audio content, determining a gain based at least in part upon the intelligibility metric, applying the gain to the selected portion to provide an enhanced portion, and providing the audio signal to the output based at least in part upon the enhanced portion.

In some examples, selecting a portion of the audio content comprises selecting a dialogue portion. The dialogue portion may be derived from at least one of a center channel of the audio content and a correlated portion of a left and right channel of the audio content in certain examples.

Certain examples include calculating a reference intelligibility metric based at least in part upon the audio content and a reference environment, and to determine the gain based at least in part upon a comparison of the intelligibility metric to the reference intelligibility metric.

Various examples include detecting an environmental noise signal and calculating the intelligibility metric of the selected portion relative to a combination of the other portions and the environmental noise signal. Some examples may include reducing an echo component of the environmental noise signal, the echo component correlated to the audio content.

Some examples include calculating an enhanced intelligibility metric of the enhanced portion relative to the other portions, wherein determining the gain based at least in part upon the intelligibility metric includes determining the gain based at least in part upon the enhanced intelligibility metric.

According to another aspect, an audio sound system is provided that includes at least one acoustic transducer, an input to receive a selected signal of a program content signal, an input to receive other portions of the program content signal, an input to receive an environmental noise signal, and a processor configured to calculate an intelligibility metric of the selected signal relative to a combination of the other portions and the environmental noise signal, to determine a gain based at least in part upon the intelligibility metric, to apply the gain to the selected signal to provide an enhanced signal, and to provide the enhanced signal and the other portions to the at least one acoustic transducer.

Certain examples include one or more microphones to provide the environmental noise signal.

In some examples, the processor is further configured to provide a dialogue signal as the selected signal. The processor may be configured to provide the dialogue signal based upon at least one of a center channel of the program content signal and a correlated portion of a left and right channel of the program content signal, in certain examples.

In various examples, the processor may be further configured to calculate a reference intelligibility metric based at least in part upon the selected signal, the other portions, and a reference noise signal, and to determine the gain based at least in part upon a comparison of the intelligibility metric to the reference intelligibility metric.

In various examples, the processor may be further configured to calculate an enhanced intelligibility metric of the enhanced signal relative to the other portions, and to determine the gain based at least in part upon the intelligibility metric and the enhanced intelligibility metric.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like numeral. For purposes of clarity, not every component may be labeled in every figure. In the figures.

DETAILED DESCRIPTION

Aspects of the present disclosure are directed to audio systems and methods that enhance selected portions of audio content to improve user experience. For example, speech intelligibility may be enhanced by selecting and applying a gain to a speech portion of audio content (e.g., relative to sound effects, music, and sounds in the environment). In other examples, detail sounds, such as whispers or low sound effects, that may otherwise be lost among louder sounds, sounds having higher dynamic range, or room noise, may be enhanced by selecting and applying a gain to a selected portion of the audio content that includes the detail sounds.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, right and left, top and bottom, upper and lower, and vertical and horizontal are intended for convenience of description, not to limit the present systems and methods or their components to any one positional or spatial orientation.

Figure 1:
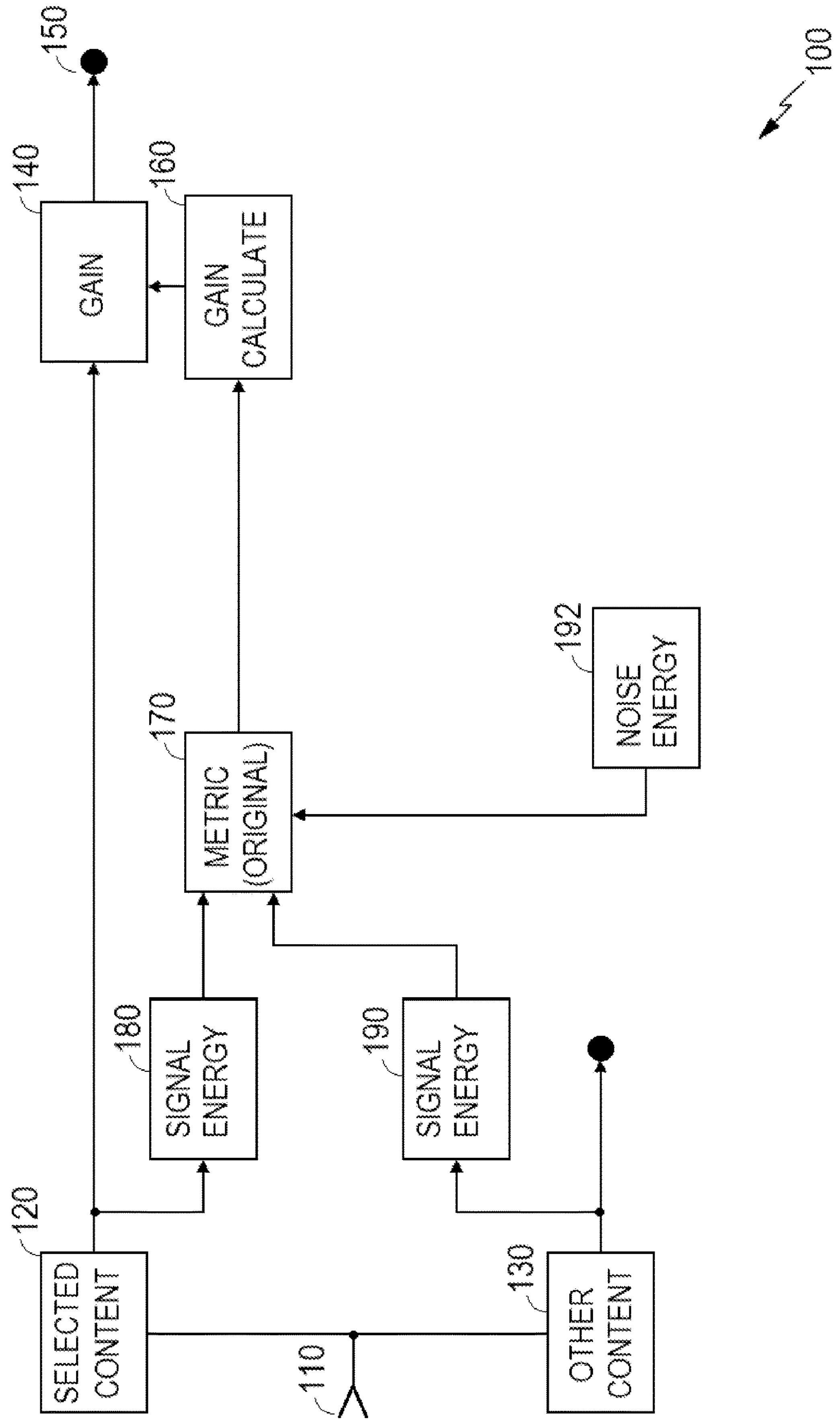
FIG. 1 is a signal flow and block diagram of an example audio system.

FIG. 1 illustrates an example audio system 100. The audio system 100 includes an audio input 110 to receive audio content, which may be in various forms. The audio input 110 may separate the audio content into a selected portion 120 and other portion(s) 130, by various means, or the audio content may be pre-arranged or already separated into a selected portion 120 and other portion(s) 130. In various examples, the selected portion 120 is selected to be enhanced relative to the other portion 130, or in some examples, relative to a room or environmental background noise, e.g., represented by a noise signal energy 192, which may be estimated based upon an expected noise level and/or may be informed by other inputs or sensors, such as a microphone as discussed in greater detail below, or relative to a combination of the other portion 130 and the noise signal energy 192.

The audio system 100 enhances the selected portion 120 by, e.g., applying a gain 140, to provide an enhanced portion 150. In some examples, various values of the gain 140 may be selected for various frequency bands, or frequency bins. The gain 140 may include an equalization component. In some examples, the audio system 100 may enhance the selected portion 120 or apply the gain 140 in various ways, such as by controlling an amount of compression of a dynamic range compressor, for example. In various examples, the other portion 130 of the audio content is not enhanced, but passes through and may, in some examples, be combined with the enhanced portion 150 to provide audio content similar to that received at the audio input 110, except that the selected portion 120 is enhanced (e.g., enhanced portion 150) relative to the other portion 130.

In various examples, the selected portion 120 may include speech portions of the audio content, and the gain 140 is applied such that a speech intelligibility of the audio content is increased. For example, an output audio content that includes the enhanced portion 150 and the other portion 130 may have increased speech intelligibility relative to the received audio content. In various examples, the selected portion 120 may represent dialogue or speech portions, subtle (e.g., low volume) sound effects or whispers, announcement messages from a combination audio system (e.g., a virtual personal assistant, doorbell, etc., mixed with other audio content), rear surround or height channel audio content (e.g., playback at low volume settings may be difficult to hear, gain enhancement applied to these channels may improve surround immersion at low listening levels), etc. Any of numerous descriptions for a selected portion 120 may be the bases for enhancement Additionally, any of numerous methods of identifying components of the audio content as the selected portion 120 may be utilized in various examples of an audio system 100. For instance, an object-based audio stream (e.g., Dolby Atmos™, DTS-X, MPEG-H, etc.) may identify one or more streams or channels as being dialogue, announcement audio, etc. Further examples may include selecting a particular channel or a correlated portion of multiple channels, e.g., of a stereo pair or any of numerous multi-channel (e.g., surround) audio content. For instance, dialogue may be substantially present in a center channel, and the center channel may be selected as the selected portion 120. In other examples, dialogue may be substantially equally present in each of a left and right channel, and correlated components of the left and right channel may be selected as the selected portion 120. In further examples, correlated components of left, right, and center channels may be the selected portion 120, or a selected portion 120 may be any combination of correlated channel content and/or individual channels, to accommodate varying system requirements or applications. In some examples, rear channel audio content may be selected for enhancement. For example, when listening at low volumes, a rear channel audio content may benefit from enhancement (e.g., by applied gain 140) to improve the sound field and surround sound experience.

In some examples, the selected portion 120 may be selected and/or limited to a relevant frequency content or frequency band, such as a speech or vocal frequency band, for example from 200 Hz to 3.4 kHz. In some examples, a selected portion 120 may be a frequency band of 50 to 12,000 Hz. Other examples may be 100 to 8,000 Hz, or 200 to 4,000 Hz.

With further reference to FIG. 1, in various examples, a gain calculator 160 may calculate, select, or otherwise determine a value of gain 140 to be applied to the selected portion 120. The determination of a gain value, by the gain calculator 160, may be based upon an original metric 170 that represents a characteristic of the audio content as received at the audio input, e.g., prior to enhancement of the selected portion 120. For instance, in examples of the audio system 100 for which the selected portion 120 is substantially dialogue content, the original metric 170 may be a speech intelligibility metric. In such examples, the other portion 130 may include substantially non-dialogue content. At least one example of a speech intelligibility metric that may be included as the original metric 170 is a speech transmission index (STI), such as the International Electrotechnical Commission (IEC) standard 60268-16. The IEC 60286-16 standard defines an STI that is a quantitative metric based upon empirical speech intelligibility studies and provides a good balance of accuracy and real-time computability. In other examples to enhance dialogue, various other speech intelligibility metrics may be substituted.

In various examples, the gain calculator 160 may determine a gain 140 intended to improve upon the original metric 170, e.g., by a certain amount and/or to reach a certain target. Accordingly, in various examples, the gain calculator 160 may incorporate a target metric. A target metric may be a certain metric value, or may be an amount of improvement to the metric, or may take other forms. In various examples, a target metric may be a default target, may be user-configurable and/or adjustable, may be a calculated target, and/or may be based upon further inputs, such as a reference metric for a reference environment, as described in more detail below. In various examples, a reference or calculated target metric may be based upon various quantities such as frequency distribution, spectrum, or other characteristics of any of the selected portion 120, the other portion 130, noise in the listening environment, acoustic properties of a reference environment, and/or other quantities or values, and may include reference to a lookup table or other stored values, to determine a target metric.

In various examples, the original metric 170 may be calculated from the signal energy content in each of the selected portion 120 and the other portion 130. Accordingly, in some examples, selected signal energy 180 and other signal energy 190 may be calculated and provided as inputs for the original metric 170. In various examples, the original metric 170 may depend upon signal energies by frequency sub-band of the various audio content, thus the selected signal energy 180 and the other signal energy 190 may be calculated and provided on a sub-band basis. For example, the IEC 60268-16 standard provides a scalar value that represents the level of dialogue intelligibility based on the signal to noise ratios (ratios of selected portion 120 to other portion 130) analyzed across multiple frequency bands.

In various examples, the selected signal energy 180 and the other signal energy 190 may be calculated from the total energy (by sub-band) of their respective signals, or in various examples may be scaled by a playback sensitivity, which may include such factors as volume setting, downstream processing, equalization, effects of various electronics and acoustics and/or acousto-mechanical effects, and/or room characteristics. Such scaling by playback sensitivity may be frequency dependent. In some examples, room characteristics may include room reverberation, which may be a measured or otherwise detected characteristic, or may incorporate or assume a typical room or home reverberation characteristic. In various examples, some of the preceding characteristics may be accounted for in the calculation of the original metric 170 or by the gain calculator 160.

In various examples, the original metric 170 and/or the gain calculator 160 may also incorporate further effects of human hearing and/or acoustic interpretation or experience, e.g., psychoacoustic effects such as human hearing thresholds, masking, and the like.

Various examples of systems and methods in accord with those described herein may include one or more acoustic drivers for the production of acoustic signals from one or more playback signals. For example, the audio system 100 may include one or more loudspeakers. The audio system 100 may enhance the selected portion 120 and provide the enhanced portion 150 and the other portion 130 to the one or more loudspeakers for playback as acoustic signals. Further, various amplification, equalization, and other components of a complete audio system are not shown in the various figures. Various examples of such audio systems include, but are not limited to, a home media system, a soundbar system, a portable speaker, a headphone or headset system, an automotive audio system, a speakerphone system, etc. Examples of audio inputs 110 to receive audio content from an audio source may include a wired connection, e.g., optical, coaxial, Ethernet, or a wireless connection, e.g., Bluetooth™, wireless LAN, using any of various protocols and/or signal formats. Audio content may be received in any of these or any of various formats or combinations. Such audio sources may include a television, a video player, a gaming system, a smartphone, a file server, or the like.

In various examples, a user may listen to audio content in a noisy environment. Environmental acoustic sources such as fans, HVAC systems, refrigerant (e.g., refrigerator) pumps, or various other machinery, equipment, engine, wind noise, road noise, and the like, may degrade the user's acoustic experience while listening to various audio content. Accordingly, various audio systems in accord with those disclosed herein may incorporate microphones to sense the acoustic environment and may incorporate acoustic information about the environment for enhancement of the selected portion 120.

Figure 2:
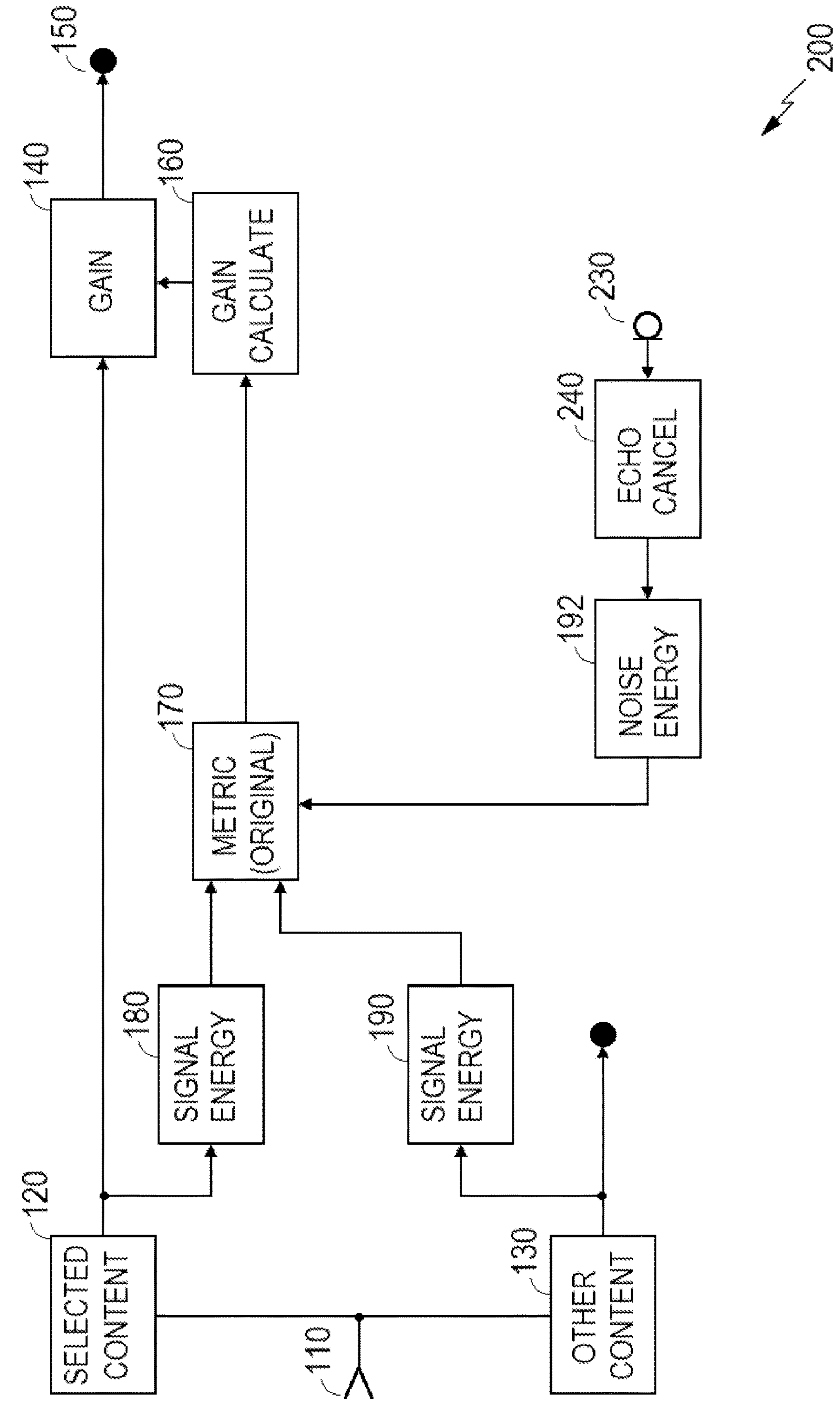
FIG. 2 is a signal flow and block diagram of a further example audio system.

FIG. 2 illustrates a further example of an audio system 200 that incorporates detection of the acoustic environment in which the audio system 200 is used. The audio system 200 is similar to the audio system 100 and further includes a microphone 230 to detect acoustics in the room/environment. In various examples, the microphone 230 may be of any type suitable to detect acoustic signals and convert them into signal formats useful to the audio system 200. In various examples, the microphone 230 may be multiple microphones whose signals may be analyzed individually or in combination and may in certain examples form an array of microphones. In various examples, the microphone 230 may pick up acoustic signals produced by the audio system 200 (e.g., by one or more loudspeakers, not shown), and an echo canceler 240 may be included to remove or reduce echo component(s) in the signal(s) provided by the microphone 230. In various examples, the microphone 230 may be located with or incorporated into a form factor along with the other components shown or may be remote. For example, the microphone 230 may be incorporated into a sound bar, portable speaker, headphones, etc., and/or may be incorporated into a remote component, such as a puck form factor, or may exist within another device, such as incorporated with a headphone or on a smartphone, and may provide microphone signals to the remainder of the audio system 200 via a wired or wireless connection.

The microphone 230, optionally provided with the echo canceler 240, may therefore provide a signal indicative of the noise in the listening environment. Accordingly, the noise signal energy 192 may be calculated based upon the microphone 230. The original metric 170 of the audio system 200 determines a similar metric as that in the audio system 100, based upon the selected signal energy 180 with respect to a combination of the other signal energy 190 and the noise signal energy 192, e.g., thereby accounting for the acoustic noise in the listening environment. In certain examples, the original metric 170 may add the other signal energy 190 and the noise signal energy 192 (on a per sub-band basis in some examples) and provide a metric based on the combination. In at least one example, the original metric 170 may be a speech intelligibility metric based upon the selected signal energy 180 (representative of dialogue) relative to all other content (e.g., the other signal energy 190 and the noise signal energy 192).

In some instances, the selected portion 120 may include all audio content received at the audio input 110, to apply the gain 140 to the entire signal, to enhance the entire audio content relative to the noise signal energy 192.

Figure 3:
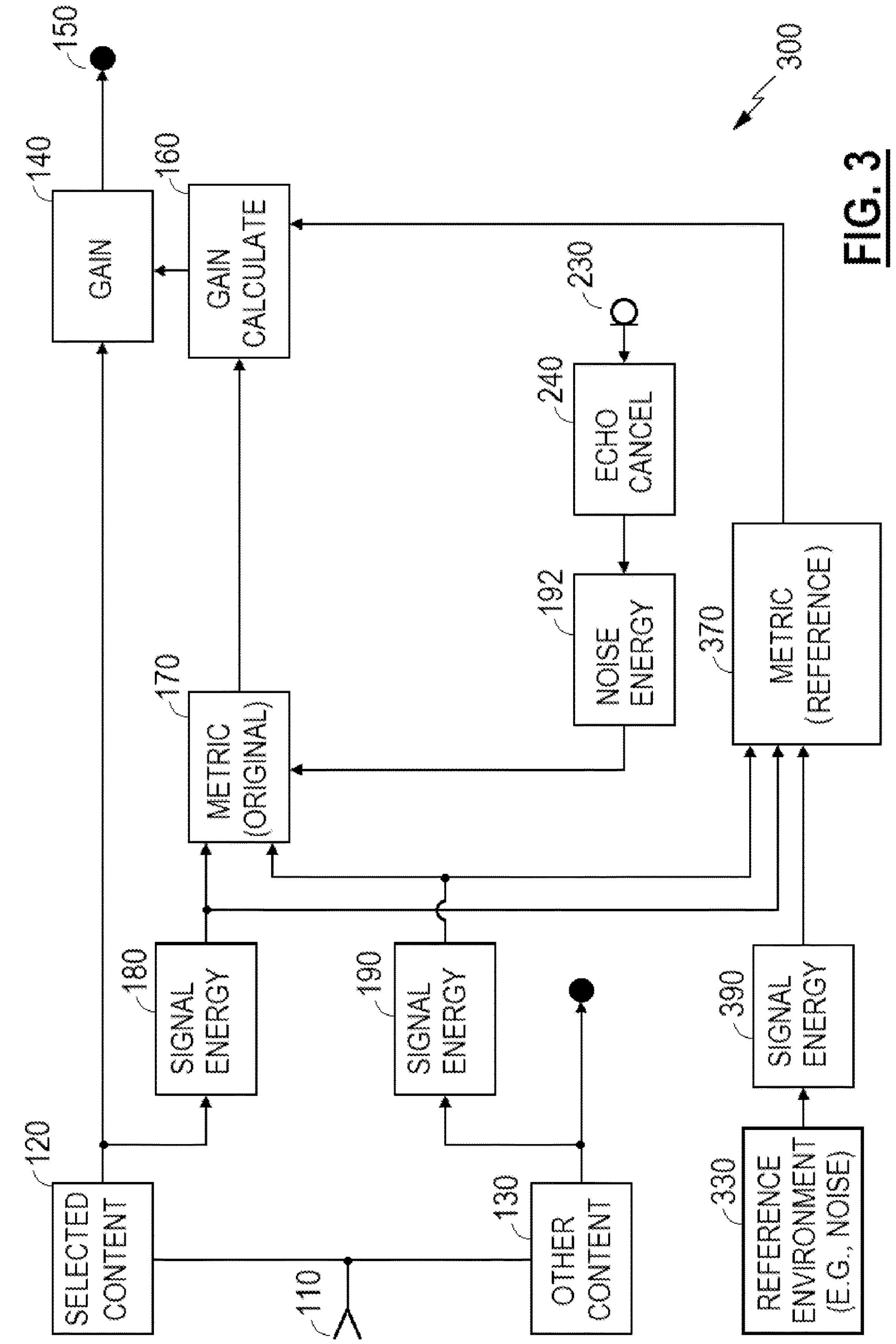
FIG. 3 is a signal flow and block diagram of a further example audio system.

FIG. 3 illustrates a further example of an audio system 300, which is similar to the audio systems 100, 200 and incorporates a target metric based upon a reference environment. For example, various audio systems in accord with those described herein may enhance the selected portion 120 to improve intelligibility of dialogue, as described above. In some examples, the audio system 300 may enhance selected portion 120 to achieve a target intelligibility with respect to an intelligibility that might exist in a native environment for the audio content received (e.g., at the audio input 110). For instance, received audio content may represent an audio portion of a movie, and the movie may be primarily intended to be consumed in a theatre. The audio system 300 may establish a target intelligibility for a user in a home environment to substantially match the intelligibility that would exist in a movie theatre. Accordingly, the audio system 300 may calculate a reference metric 370 based upon the audio content (represented by the selected signal energy 180 and the other signal energy 190) and a reference noise signal energy 390. The reference noise signal energy 390 represents and may be based upon expected acoustic characteristics in a reference environment, represented as reference noise 330 in FIG. 3. For example, a reference environment might include certain noise sources and acoustic characteristics that may be different than those in a home living room, classroom, gymnasium, etc., and such characteristics may be modeled and provided to determine the reference noise signal energy 390. Various characteristics of the reference environment might include acoustic aspects (e.g., reverb, frequency response, etc.), noise sources, audio equipment, etc. of the reference environment.

In some examples, the reference metric 370 may be a dialogue intelligibility metric, and the selected portion 120 may substantially represent dialogue while the other portion 130 may substantially represent non-dialogue. The reference metric 370, in such examples, may represent an intelligibility that would exist if the audio content were being reproduced in the reference environment. In various examples, the reference metric 370 may be other types of metrics. For example, the selected portion 120, in some examples, may include detail content (e.g., whispers, quiet sound effects, rear channels played at low volume, etc.), the original metric 170 may quantify human perception of the detail content, and the reference metric 370 may quantify human perception of the detail content as would be perceived in the reference environment. Accordingly, the reference metric 370 may be provided as a target metric to the gain calculator 160, to determine an amount of gain 140 to be applied to the selected portion 120 to provide the enhanced portion 150, such that the enhanced portion 150 in combination with the other portion 130 may achieve a similar experience (e.g., with respect to the metric applied) as would occur in the reference environment.

While the audio system 300 incorporates a microphone 230 and determines an original metric 170 based upon the audio content(s) and the noise signal energy 192 in the actual listening environment, other examples may optionally exclude the microphone 230 and related components. For instance, various audio systems in accord with those herein may incorporate a target metric based upon a reference environment (e.g., a reference metric 370), without incorporating a microphone 230 and/or regardless of the actual acoustic environment, similar the audio system 100, that may determine an original metric 170 without the noise signal energy 192.

Each of the audio systems 100, 200, and 300 described above determine a gain 140 to be applied to a selected portion 120 to provide an enhanced portion 150, based upon at least one metric. Further examples may incorporate additional feedback to measure, detect, or determine whether the applied gain 140 is successful at achieving a desired enhancement, e.g., with respect to the type of metric applied.

Figure 4:
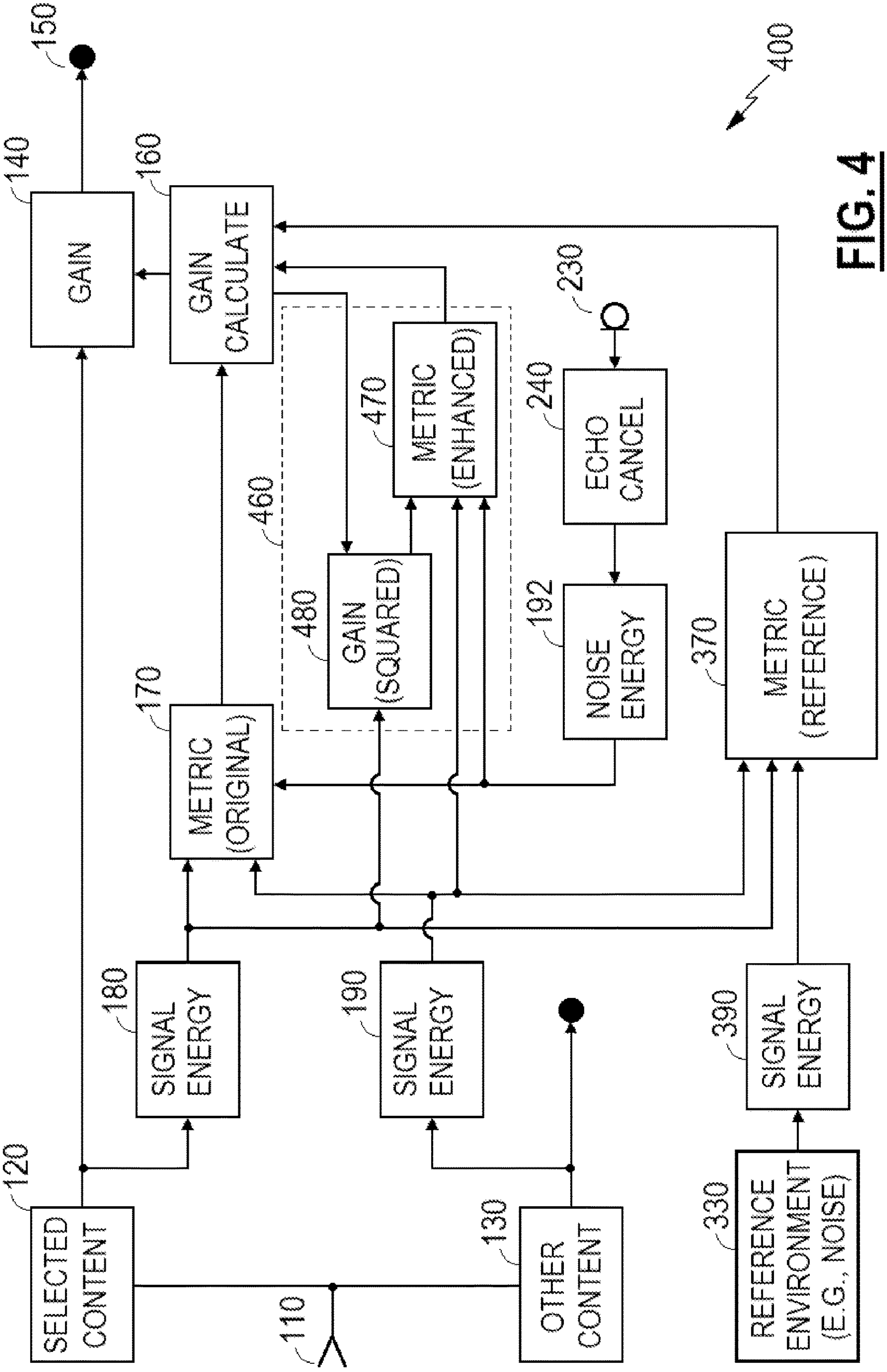
FIG. 4 is a signal flow and block diagram of a further example audio system.

FIG. 4 illustrates a further example of an audio system 400, which is similar to the audio systems 100, 200, 300 and incorporates a feedback mechanism 460 to determine an enhanced metric 470, which is an estimated or actual metric value representative of the improvement achieved by, e.g., the applied gain 140 (e.g., in terms of the metric used for the original metric 170). In various examples, the feedback mechanism 460 may apply a comparable enhancement (e.g., the gain 140 from the gain calculator 160) to the selected signal energy 180 to provide a measure of the enhanced signal energy 480. In various examples, the enhanced signal energy 480 may be determined by multiplying the selected signal energy 180 by the square of the gain 140. In other examples, a signal energy of the enhanced portion 150 may be determined to provide an enhanced signal energy. The enhanced signal energy 480 is used, along with the other signal energy 190 and, optionally, the noise signal energy 192, to determine an enhanced metric 470. The enhanced metric 470 is representative of the resulting metric (e.g., intelligibility, detail enhancement, surround compensation, etc.) provided by the enhancement of the system (e.g., the gain 140 applied to the selected portion 120). The enhanced metric 470 is provided to the gain calculator 160, and used as a measure of whether the applied gain 140 achieves the desired result, e.g., the target metric, which may be the reference metric 370 (as shown in FIG. 4), but may be other target metrics in various examples. In some examples, the gain calculator 160 may compare the enhanced metric 470 to the target metric (e.g., the reference metric 370) to determine whether the enhanced metric 470 meets the target metric, or is within a threshold of the target metric, or exceeds the target metric, etc. The gain calculator 160 may, as a result, adjust the value of gain 140 applied to the selected portion 120.

Various examples of audio systems in accord with those described herein may incorporate various combinations of the components described and shown in the figures. For example, the audio system 100 of FIG. 1 illustrates a first example of an enhancement audio system. The audio system 200 of FIG. 2 illustrates one example of an additional capability to detect and incorporate knowledge of the acoustics of the listening environment. The audio system 300 of FIG. 3 illustrates one example of an additional capability to establish a target metric (for enhancement) based upon a reference environment, e.g., where the audio content is originally intended to be consumed. The audio system 400 of FIG. 4 illustrates one example of an additional capability to measure an achieved enhancement, as additional feedback to the audio system, upon which to base further adjustment to the applied enhancement. In various audio systems in accord with those described herein may incorporate any one of the illustrated additional capabilities without incorporating others or may incorporate different combinations of the illustrated capabilities.

Various components described and shown in the figures are not necessarily distinct physical components. The figures illustrate functional block diagrams that may be representative of functions performed by a processor, such as by a digital signal processor, which may include various instructions stored in a memory for performing such processes.

Further, the figures illustrate signal flow diagrams that provide examples of various signals being processed in various ways. Various of the signal processing may be performed in differing orders and/or different arrangements that those shown, across various audio systems in accord with those described.

In various examples, the various processing may be performed by a single processor or controller, or various processing functions may be distributed across numerous processors or controller. No particular division of processing functionality across hardware processing platforms is intended to be implied by the figures.

It should be understood that many of the functions, methods, and/or components of the systems disclosed herein according to various aspects and examples may be implemented or carried out in a digital signal processor and/or other circuitry, analog or digital, suitable for performing signal processing and other functions in accord with the aspects and examples disclosed herein. Additionally or alternatively, a microprocessor, a logic controller, logic circuits, field programmable gate array(s), application-specific integrated circuit(s), general computing processor(s), micro-controller(s), and the like, or any combination of these, may be suitable, and may include analog or digital circuit components and/or other components with respect to any particular implementation Functions and components disclosed herein may operate in the digital domain, the analog domain, or a combination of the two, and certain examples include analog-to-digital converter(s) (ADC) and/or digital-to-analog converter(s) (DAC) where appropriate, despite the lack of illustration of ADC's or DAC's in the various figures. Further, functions and components disclosed herein may operate in a time domain, a frequency domain, or a combination of the two, and certain examples include various forms of Fourier or similar analysis, synthesis, and/or transforms to accommodate processing in the various domains. Further, processing may occur on a limited bandwidth (e.g., voice/speech frequency range) and/or may operate on a per sub-band basis.

Any suitable hardware and/or software, including firmware and the like, may be configured to carry out or implement components of the aspects and examples disclosed herein, and various implementations of aspects and examples may include components and/or functionality in addition to those disclosed. Various implementations may include stored instructions for a digital signal processor and/or other circuitry to enable the circuitry, at least in part, to perform the functions described herein.

It should be understood that an acoustic transducer, microphone, driver, or loudspeaker, may be any of many types of transducers known in the art. For example, an acoustic structure coupled to a coil positioned in a magnetic field, to cause electrical signals in response to motion, or to cause motion in response to electrical signals, may be a suitable acoustic transducer. Additionally, a piezoelectric material may respond in manners to convert acoustical signals to electrical signals, and the reverse, and may be a suitable acoustic transducer. Further, micro-electrical mechanical systems may be employed as, or be a component for, a suitable acoustic transducer. Any of these or other forms of acoustic transducers may be suitable and included in various examples.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An audio system comprising:

an input configured to receive audio content;

an output configured to playback audio in a listening environment;

one or more microphones configured to detect environmental acoustic signals in the listening environment; and at least one processor coupled to the input and to the output, the at least one processor configured to determine an environmental noise signal based on the detected environmental acoustic signals in the listening environment, select a portion of the audio content to be enhanced relative to other portions of the audio content, calculate an intelligibility metric of the selected portion using the environmental noise signal, calculate a reference intelligibility metric based at least in part upon the audio content and a reference environment, wherein the reference intelligibility metric represents an intelligibility that would exist if the audio content were reproduced in the reference environment, determine an enhancement based at least in part upon a comparison of the intelligibility metric to the reference intelligibility metric, apply the enhancement to the selected portion to provide an enhanced portion, and combine the enhanced portion with the other portions of the audio content for playback via the output.

2. The audio system of claim 1, wherein the selected the portion is dialogue and the intelligibility metric is a speech intelligibility metric of the selected portion relative to the other portions of the audio content.

3. The audio system of claim 1, wherein the selected portion is based upon at least one of i) a center channel of the audio content or ii) a correlated portion of left and right channels of the audio content.

4. The audio system of claim 1, wherein the selected portion is selected from a specific frequency band, wherein the specific frequency band is a speech or vocal frequency band.

5. The audio system of claim 1, further comprising an echo canceller coupled to the one or more microphones to reduce or remove the audio from the output when determining the environmental noise signal.

6. The audio system of claim 1, wherein the enhancement includes at least one of a gain or an equalization component applied to the selected portion.

7. The audio system of claim 1, wherein the audio system is one of a home media system, a soundbar system, a portable speaker, a headphone or headset system, an automotive audio system, or a speakerphone system.

8. A method of enhancing a portion of audio content playback by an audio system in a listening environment, the method comprising:

receiving the audio content;

detecting, using one or more microphones of the audio system, environmental acoustic signals in the listening environment;

determining an environmental noise signal based on the detected environmental acoustic signals;

selecting the portion of the audio content to be enhanced relative to other portions of the audio content;

calculating an intelligibility metric of the selected portion using the environmental noise signal;

calculating a reference intelligibility metric based at least in part upon the audio content and a reference environment, wherein the reference intelligibility metric represents an intelligibility that would exist if the audio content were reproduced in the reference environment;

determining an enhancement based at least in part upon a comparison of the intelligibility metric to the reference intelligibility metric;

applying the enhancement to the selected portion to provide an enhanced portion; and combining the enhanced portion with the other portions of the audio content for playback via an output of the audio system.

9. The method of claim 8, wherein the selected the portion is dialogue and the intelligibility metric is a speech intelligibility metric of the selected portion relative to the other portions of the audio content.

10. The method of claim 8, wherein the selected portion is based upon at least one of i) a center channel of the audio content or ii) a correlated portion of left and right channels of the audio content.

11. The method of claim 8, wherein the selected portion is selected from a specific frequency band, wherein the specific frequency band is a speech or vocal frequency band.

12. The method of claim 8, further comprising reducing or removing, using an echo canceller coupled to the one or more microphones, the audio from the output when determining the environmental noise signal.

13. The method of claim 8, wherein the enhancement includes at least one of a gain or an equalization component applied to the selected portion.

14. The method of claim 8, wherein the audio system is one of a home media system, a soundbar system, a portable speaker, a headphone or headset system, an automotive audio system, or a speakerphone system.

15. The audio system of claim 1, wherein the processor is further configured to:

calculate an enhanced metric that includes an estimated or actual metric value representing an improvement achieved by the applied enhancement to the selected portion, and adjust the applied enhancement in response to the enhanced metric deviating from the reference intelligibility metric by a threshold.

16. The method of claim 8, further comprising:

calculating an enhanced metric that includes an estimated or actual metric value representing an improvement achieved by the applied enhancement to the selected portion, and adjusting the applied enhancement in response to the enhanced metric deviating from the reference intelligibility metric by a threshold.

17. The audio system of claim 15, wherein the applied enhancement includes a gain applied to the selected portion, wherein the adjustment to the applied enhancement is determined by multiplying the selected portion by a square of the gain applied to the selected portion.

18. The method of claim 16, wherein the applied enhancement includes a gain applied to the selected portion, wherein the adjustment to the applied enhancement is determined by multiplying the selected portion by a square of the gain applied to the selected portion.

19. An audio system comprising:

an input configured to receive audio content;

an output configured to playback audio in a listening environment;

one or more microphones configured to detect environmental acoustic signals in the listening environment; and at least one processor coupled to the input and to the output, the at least one processor configured to determine an environmental noise signal based on the detected environmental acoustic signals in the listening environment, select a portion of the audio content to be enhanced relative to other portions of the audio content, wherein the selected portion is dialogue, calculate an intelligibility metric of the selected portion using the environmental noise signal, wherein the intelligibility metric is a speech intelligibility metric of the selected portion relative to the other portions of the audio content, calculate a reference intelligibility metric based at least in part upon the audio content and a reference environment, wherein the reference intelligibility metric represents an intelligibility that would exist if the audio content were reproduced in the reference environment, determine a gain to be applied to the selected portion based at least in part upon a comparison of the intelligibility metric to the reference intelligibility metric, calculate an enhanced metric that includes an estimated or actual metric value representing an improvement achieved by the gain to the selected portion, adjust the gain in response to the enhancement metric deviating from the reference intelligibility metric by a threshold to provide an adjusted gain, apply the adjusted gain to the selected portion to provide an enhanced portion, and combine the enhanced portion with the other portions of the audio content for playback via the output.

20. The audio system of claim 19, wherein calculating the enhanced metric and providing the adjusted gain are performed iteratively until a difference in the enhancement metric and the reference intelligibility metric satisfies the threshold.

* * * * *